(12) United States Patent
Macken et al.

(10) Patent No.: US 6,169,646 B1
(45) Date of Patent: Jan. 2, 2001

(54) MAGNETORESISTIVE SHIELD INCORPORATING SEEDLAYER FOR ANISOTROPY ENHANCEMENT

(75) Inventors: Declan Macken; Kevin J. Duddy, both of County Derry (IE)

(73) Assignee: Seagate Technology, Inc., Scotts Valley, CA (US)

(*) Notice: Under 35 U.S.C. 154(b), the term of this patent shall be extended for 0 days.

(21) Appl. No.: 09/271,052

(22) Filed: Mar. 17, 1999

Related U.S. Application Data

(60) Provisional application No. 60/109,225, filed on Nov. 18, 1998.

(51) Int. Cl.[7] ................................................. G11B 5/39
(52) U.S. Cl. .................................................. 360/319
(58) Field of Search ................................. 360/317, 319

(56) References Cited

U.S. PATENT DOCUMENTS

| | | | |
|---|---|---|---|
| 4,750,072 | 6/1988 | Takagi | 360/126 |
| 4,803,580 | 2/1989 | Mowry | 360/113 |
| 4,814,921 | 3/1989 | Hamakawa et al. | 360/126 |
| 4,821,133 | 4/1989 | Mowry et al. | 360/113 |
| 4,843,506 | 6/1989 | Gill et al. | 360/113 |
| 4,900,650 | 2/1990 | Das | 430/319 |
| 4,912,584 | 3/1990 | Mallary et al. | 360/126 |
| 4,967,298 | 10/1990 | Mowry | 360/113 |
| 5,032,945 | 6/1991 | Argyle et al. | 360/126 |
| 5,085,935 | 2/1992 | Mallary | 428/336 |
| 5,207,841 | 5/1993 | Shigeta et al. | 148/307 |
| 5,208,715 | 5/1993 | Mowry | 360/113 |
| 5,408,377 | 4/1995 | Gurney et al. | 360/113 |
| 5,515,221 | 5/1996 | Gill et al. | 360/113 |
| 5,543,989 | 8/1996 | Westwood | 360/113 |
| 5,621,592 | 4/1997 | Gill et al. | 360/113 |
| 5,666,250 | * 9/1997 | Stageberg et al. | 360/126 |
| 5,686,193 | 11/1997 | Westwood | 428/611 |
| 5,687,044 | * 11/1997 | Saito | 260/113 |
| 5,838,521 | * 11/1998 | Ravipati | 360/113 |
| 6,018,443 | * 1/2000 | Watanabe et al. | 360/113 |

FOREIGN PATENT DOCUMENTS 2-29905 * 1/1990 (JP).
5-217123 * 8/1993 (JP).

OTHER PUBLICATIONS

Richard M. Bozorth, *Ferromagnetsim*. p. 100 (1978).
"On the New Alloy 'Sendust' and Ternary Alloys Containing Fe–Si–Ai, and the Magnetic and Electrical Properties" by H. Masumoto et al; published in the *Journal of the Japan Institute of Metals*, Jul. 1937), No. 3, 127. (Orginal and Translation).

* cited by examiner

Primary Examiner—William Klimowicz
(74) Attorney, Agent, or Firm—Kinney & Lange, P.A.

(57) ABSTRACT

A layer of iron—silicon—aluminum alloy is deposited over a seedlayer of an amorphous alloy to form a shield for a read element in a recording head. Percentage weights of iron, silicon, and aluminum in the iron—silicon—aluminum alloy are each selected such that the alloy has both near-zero magnetostriction and distinct magnetocrystalline anisotropy. Use of the amorphous alloy seedlayer results in greater magnetocrystalline anisotropy in the shield.

18 Claims, 6 Drawing Sheets

MAGNETORESISTIVE SHIELD INCORPORATING SEEDLAYER FOR ANISOTROPY ENHANCEMENT

CROSS-REFERENCE TO RELATED APPLICATION

This application claims the priority benefit of a provisional U.S. patent application having application Ser. No. 60/109,225, filed on Nov. 18, 1998.

BACKGROUND OF THE INVENTION

The present invention relates generally to the field of electronic data storage and retrieval. In particular, the present invention relates to a shield design in a magnetoresistive reader that reduces magnetic interactions between a magnetic read head shield and a magnetic read element by controlling domain wall movement within the shield.

Magnetoresistive (MR) read heads utilize an MR element positioned between a top and a bottom shield to read magnetically-encoded information from a magnetic medium, such as a disc, by detecting magnetic flux stored on the magnetic medium. The read element may be either an anisotropic magnetoresistive (AMR) element or a giant magnetoresistive (GMR) stack. An AMR element is typically fabricated from iron, nickel, or cobalt-based soft ferromagnetic alloys; whereas a GMR stack is a multi-layered structure generally having two separate layers formed from iron, nickel, or cobalt-based soft ferromagnetic alloys separated by a spacer layer formed from nonmagnetic materials, such as copper, silver, or gold.

The read element, which is magnetized along its easy axis, is mounted on the read head such that its easy axis is transverse to the direction of disc rotation and parallel to the plane of the disc. Magnetic flux from the disc surface causes rotation of the magnetization vector of the read element, which in turn causes a change in electrical resistivity of the read element. The change in resistivity of the read element can be detected by passing a sense current through the read element and measuring a voltage across the read element. This voltage information can then be converted into an appropriate format to be manipulated as necessary by external circuitry.

A response curve of the read element compares the voltage across the read element to the magnetic flux received from the disc by the read element. This response curve has both linear and non-linear portions, of which it is preferred that the read element operate along the linear portions. To force the read element to operate along the linear portions, the read element is magnetically biased at a biasing point that is located along the linear portion of the response curve.

During a read operation, the top and bottom shields ensure that the read element reads only the information stored directly beneath it on a specific track of the magnetic medium or disc by absorbing any stray magnetic fields emanating from adjacent tracks and transitions.

Accordingly, the bottom shield is typically formed of materials having a relatively high permeability. Sendust (85% iron, 9.6% silicon, and 5.4% aluminum) is the generally preferred material for prior art bottom shields because of its near-zero magnetostriction and mechanical hardness. Sendust-shielded read elements can be machined easily to form sliders with minimal smearing across the read element. Smearing across the read element may result in electrical shorts between the read element and the top or bottom shield.

Although sendust is the generally preferred material for use as the bottom shield in read heads, its near-zero magnetocrystalline anisotropy can result in noise in the read element. Within a typical shield exists a plurality of magnetic domains separated from each other by a plurality of magnetic domain walls. Each domain has a magnetization that is oriented in a direction different than the magnetization of all adjacent domains. Because of the near-zero magnetocrystalline anisotropy of a sendust-formed shield, the domain walls within a sendust-formed shield are totally random, although the shape of the shield may somewhat control the location of the domain walls. In addition, the application of an external magnetic field, either during manufacture or from an adjacent track or transition of the magnetic storage medium during operation, to the bottom shield can cause the magnetization of each of the domains within that shield to rotate, thereby causing the domains to move. Thus, the domain walls are relocated due to the external magnetic field. Furthermore, because of the random nature of the domain wall location, the domain walls generally do not return to their original location after the external magnetic field is removed.

The bottom shield exerts stray magnetic fields on the read element. These stray fields are accounted for when the read element is biased. As the domain walls move, however, these stray magnetic fields change, thus changing the bias point of the read element, as well as the response of the read element to signals emanating from the rotating disc. The overall result is noise during the read operation.

It has been found that the introduction of anisotropy into a shield will result in more predictable domain wall locations within the shield; however, it has also been found that the controlled introduction of anisotropy into a material having near-zero magnetocrystalline anisotropy, such as sendust, is virtually impossible. There is therefore a need for a shield design having the advantages of a sendust-formed shield with a shield having magnetocrystalline anisotropy to reduce noise in the read element by reducing domain wall movement within the shield.

BRIEF SUMMARY OF THE INVENTION

The present invention is a shield having substantial magnetocrystalline anisotropy for a read element in a recording head. A layer of iron—silicon—aluminum alloy is positioned upon a seedlayer of amorphous alloy to form the shield. Percentage weights of iron, silicon, and aluminum in the iron—silicon—aluminum alloy are each selected so that the alloy has both near-zero magnetostriction and distinct magnetocrystalline anisotropy. Use of the amorphous alloy seedlayer results in greater overall magnetocrystalline anisotropy in the shield.

In a preferred embodiment of the iron—silicon—aluminum alloy layer, the percentage weight of iron is in the range of from about 81% to about 93%, the percentage weight of silicon is in the range of from about 6% to about 10%, and the percentage weight of aluminum is in the range of from about 0% to about 13%. Most preferably, the percentage weights of iron, silicon, and aluminum in the iron—silicon—aluminum alloy layer are, respectively, about 89 percent, about 7.5 percent, and about 3.5 percent.

In a preferred embodiment of the seedlayer, the seedlayer is formed of a cobalt-amorphous family alloy or nickel. More preferably, the seedlayer is formed of a cobalt—zirconium—tantalum alloy. A preferred embodiment in which the seedlayer is formed of cobalt—zirconium—tantalum alloy preferably has a percentage weight of cobalt in the seedlayer in the range of about 70 percent to about 90 percent, and a percentage weight of zirconium in the seedlayer substantially equal to a percentage weight of tantalum in the seedlayer. Most preferably, the percentage weight of cobalt in the seedlayer is about 90 percent and the percentage weights of zirconium and tantalum in the seedlayer are each about 5 percent.

DETAILED DESCRIPTION

The present invention provides a magnetoresistive sensor having improved stability. It is recognized that a source of noise stems from magnetic domain walls within either shield of a shield system (top and bottom shields) adjacent a read element.

Figure 1:
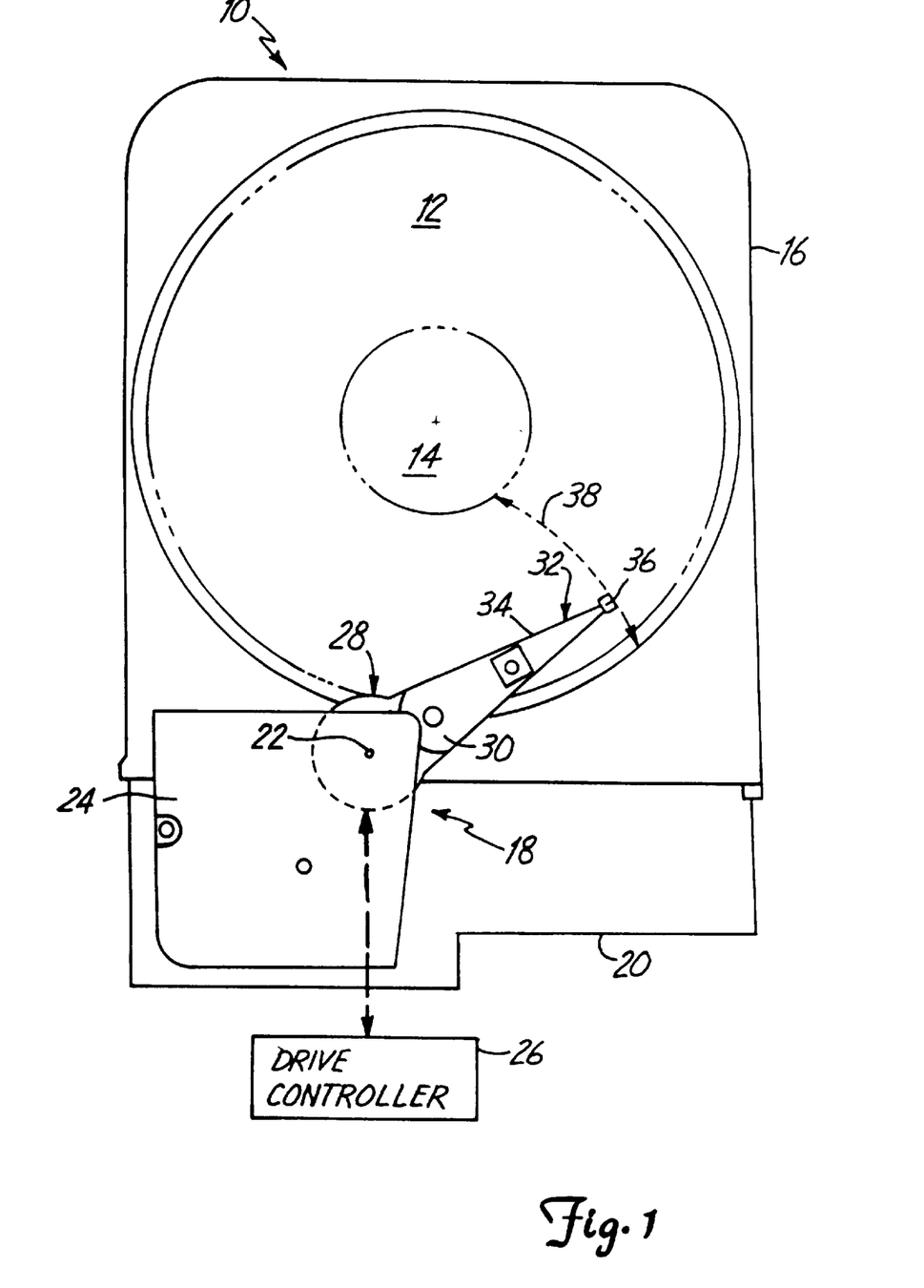
FIG. 1 is a simplified diagram of a disc drive storage system.

FIG. 1 is a top view of disc drive system 10 including a magnetoresistive (MR) read head in accord with the present invention. Disc drive system 10 includes magnetic disc 12 mounted for rotational movement about an axis defined by spindle 14 within housing 16. Disc drive 10 also includes actuator 18 mounted to base plate 20 of housing 16 and pivotally movable relative to disc 14 about axis 22. Cover 24 covers a portion of actuator 18. Drive controller 26 is coupled to actuator 18. Drive controller 26 is either mountable within disc drive system 10 or is located outside of disc drive system 10 with suitable connection to actuator 18. Actuator 18 includes actuator arm assembly 28, a rigid support member 30, and head gimbal assembly 32. Head gimbal assembly 32 includes flexure arm 34 couple to rigid member 30 and air bearing slider 36 couple to flexure arm 34 by a gimbal. Slider 36 supports a magnetoresistive transducer or head for reading information from disc 12 and encoding information to disc 12.

During operation, drive controller 26 receives position information indicating a portion of disc 12 to be accessed. Drive controller 26 receives the position information from either an operator, a host computer, or from another suitable controller. Based on the position information, drive controller 26 provides a position signal to actuator 18. The position signal causes actuator 18 to pivot about axis 22. This causes slider 36 to move radially over the surface of disc 12 in a generally arc-like path indicated by arrow 38. Drive controller 26 and actuator 18 operate in a known close loop, negative feed-back manner so that the transducer carried by slider 36 is positioned over the desired portion of disc 12. Once the transducer is appropriately positioned, drive controller 26 then executes a desired read or write operation.

Figure 2:
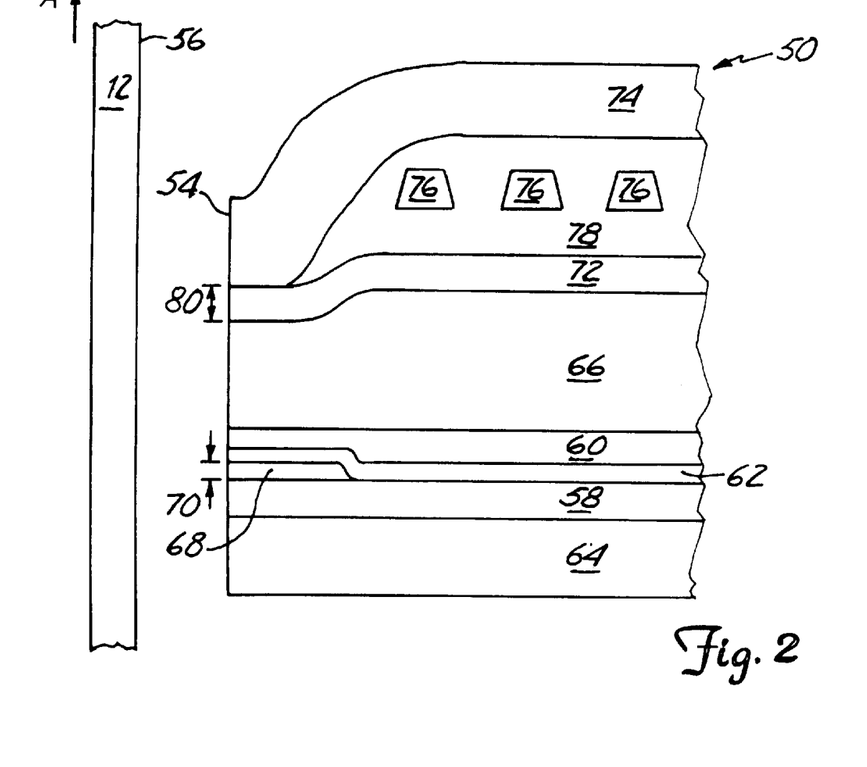
FIG. 2 is a cross-sectional view of a magnetic read/write head and a magnetic disc taken along a plane normal to an air bearing surface of the read/write head.

FIG. 2 is a cross-sectional view of magnetic read/write head 50 and magnetic disc 12 taken along a plane normal to air bearing surface 54 of read/write head 50. FIG. 2 illustrates magnetic read/write head. 50 and its placement relative to magnetic disc 12. Air bearing surface 54 of magnetic read/write head 50 faces disc surface 56 of magnetic disc 12. Magnetic disc 12 travels or rotates in a direction relative to magnetic read/write head 10 as indicated by arrow A. The spacing between air bearing surface 54 and disc surface 56 is preferably minimized while avoiding contact between magnetic read head 50 and magnetic disc 12. In most cases, contact between magnetic read head 50 and magnetic disc 12 would destroy both magnetic read head 50 and magnetic disc 12.

A reader portion of read/write head 50 includes bottom gap layer 58, top gap layer 60, metal contact layer 62, bottom shield 64, top shield 66, and read element 68. Read gap 70 is defined on air bearing surface 54 between terminating ends of bottom gap layer 58 and metal contact layer 62. Metal contact layer 62 is positioned between bottom gap layer 58 and top gap layer 60. Read element 68 is positioned between terminating ends of bottom gap layer 58 and metal contact layer 62.

A writer portion of magnetic read/write head 50 includes bottom pole 66, write gap layer 72, top pole 74, conductive coil 76, and polymer layer 78. Write gap 80 is defined on air bearing surface 54 by write gap layer 72 between terminating ends of top pole 74 and bottom pole 66. Electrically conductive coils 76 are provided to generate magnetic fields across write gap 80 and are positioned in polymer layer 78 between top pole 74 and write gap layer 72. While FIG. 2 shows a single layer of conductive coils 76, it is understood in the art that several layers of conductive coils may be used separated by several polymer layers. Read/write head 50 is a merged MR head in which element 66 is employed both as top shield 66 in the reader portion and as bottom pole 66 in the writer portion. If read/write head 50 were a piggyback MR head, top shield 66 and bottom pole 66 would be separate layers.

Figure 3:
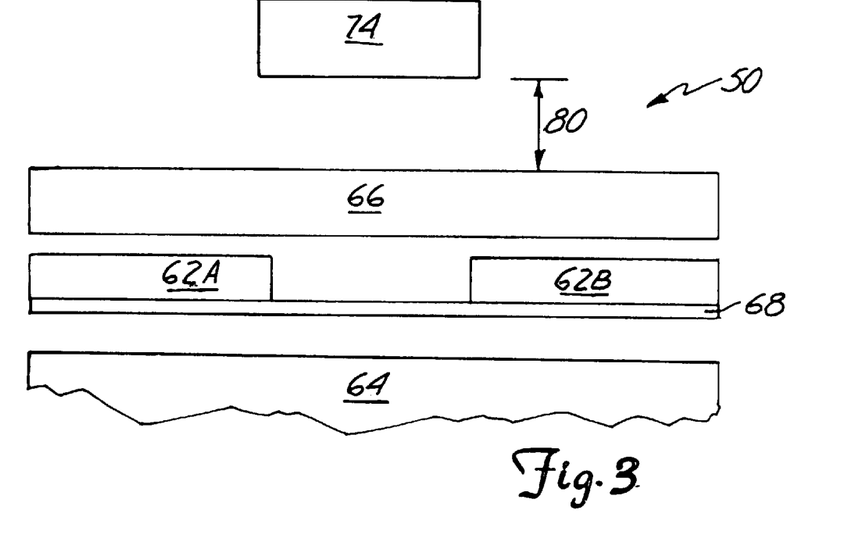
FIG. 3 is a layered diagram of a magnetic read/write head.

FIG. 3 is a layered diagram of magnetic read/write head 50. FIG. 3 illustrates the location of a plurality of magnetically significant elements of magnetic read/write head 50 as they appear along air bearing surface 54 of magnetic read/write head 50 shown in FIG. 2. In FIG. 3, all spacing and insulating layers are omitted for clarity. Bottom shield 64 and top shield 66 are spaced to provide for a location of read element 68. Read element 68 has two passive regions defined as the portions of read element 68 positioned adjacent to metal contacts 62A and 62B. An active region of read element 68 is defined as the portion of read element 68 located between the two passive regions of read element 68. The active region of read element 68 defines a read sensor width.

Read element 68 is preferably a magnetoresistive element or a giant magnetoresistive stack. A magnetoresistive element is generally formed of a ferromagnetic material whose resistance fluctuates in response to an external magnetic field, preferably from a magnetic medium or disc. By providing a sense current through the magnetoresistive element, a change in resistance of the magnetoresistive element can be measured and used by external circuitry to decipher the information stored on the magnetic medium or disc. A giant magnetoresistive stack operates similarly, but allows for a more pronounced magnetoresistive effect. A giant magnetoresistive stack is generally formed of three layers: a ferromagnetic free layer, a ferromagnetic pin layer, and a non-magnetic spacer layer positioned between the free layer and the pin layer. A pinned magnetization of the pin layer is held constant while a free magnetization of the free layer is free to rotate in response to an external magnetic field, i.e. a transition from a magnetic disc. A resistivity of the giant magnetoresistive stack varies as a function of an angle between the direction of the free magnetization and the pin magnetization.

Figure 4:
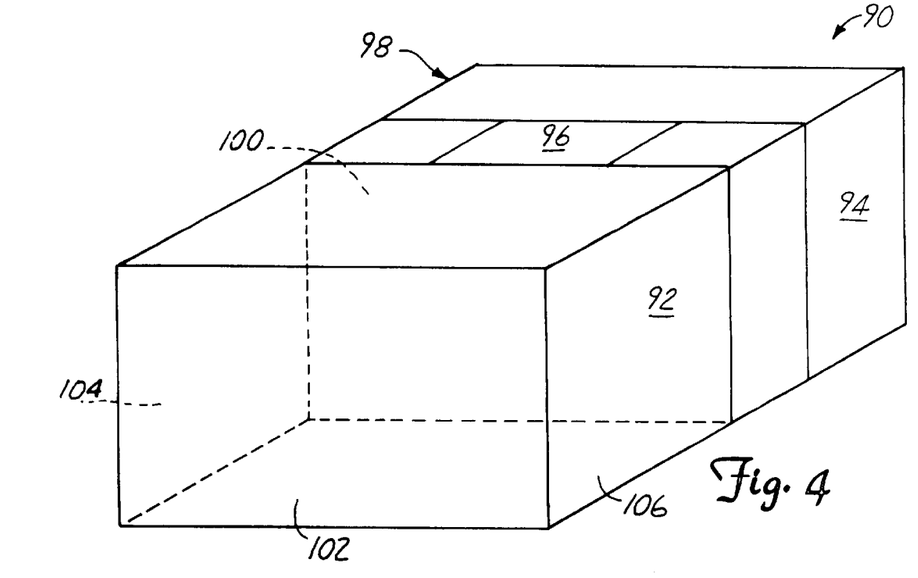
FIG. 4 is a partial perspective view of a magnetic read/write head that includes a bottom shield, a magnetic read element, and a top shield.

FIG. 4 is partial perspective view of magnetic read head 90 that generally includes bottom shield 92, top shield 94, and read element 96 positioned between bottom shield 92 and top shield 94. Magnetic read head 90 has air bearing surface 98.

Bottom shield 92 has, in prior art applications, been formed in several different shapes such as circular, square, rectangular, trapezoidal, or any combination thereof. As shown in FIG. 4, bottom shield 92 has a rectangular shape with first surface 100, shown in phantom, proximate read element 96 and second surface 102 opposite first surface 100. Third surface 104, shown in phantom, is opposite fourth surface 106 such that third surface 104 and fourth surface 106 connect first surface 100 to second surface 102. For ease of explanation, magnetic read head 90 and its components, the thicknesses of bottom shield of 92, top shield 94 and read element 96, shown in FIG. 4, are exaggerated. Top shield 98 has a similar shape as bottom shield 94. The phantom lines of top shield 98 have not been shown for clarity.

Sendust (85% iron, 9.6% silicon, and 5.4% aluminum) has, in prior art applications, been the preferred material for read element bottom shields because it has substantially no magnetostriction, and because it exhibits high permeability and high magnetic flux density. In addition, the mechanical hardness of sendust allows for sendust-shielded read elements to be machined easily to form sliders with minimal smearing across the read element; thereby minimizing the likelihood of electrical shorts occurring between the read element and top or bottom shields.

Within a typical shield exists a plurality of magnetic domains separated from each other by a plurality of magnetic domain walls. Each domain has a magnetization that is oriented in a direction different than the magnetization of all adjacent domains. Because sendust has near-zero magnetocrystalline anisotropy, the domain walls within a sendust-formed shield are totally random, although the shape of the shield may somewhat control the location of the domain walls. In addition, the application of an external magnetic field, either during manufacture or from an adjacent track or transition of the storage medium during operation, to the top or bottom shield can cause the magnetization of each of the domains within that shield to rotate, thereby causing the domains to move, grow, and/or shrink. Thus, the domain walls are relocated due to the external magnetic field. Furthermore, because of the random nature of the domain wall location, the domain walls generally do not return to their original location after the external magnetic field is removed.

The top and bottom shields exert stray magnetic fields on the read element. These stray fields are accounted for when the read element is biased. As the domain walls move, however, these stray magnetic fields change, thus changing the bias point of the read element, as well as the response of the read element to signals emanating from the storage medium. The overall result is noise during the read operation.

It has been found that the introduction of anisotropy into a shield will result in more predictable domain wall locations within the shield; however, it has also been found that the controlled introduction of anisotropy into a material having near-zero magnetocrystalline anisotropy, such as sendust, is virtually impossible.

Figure 5:
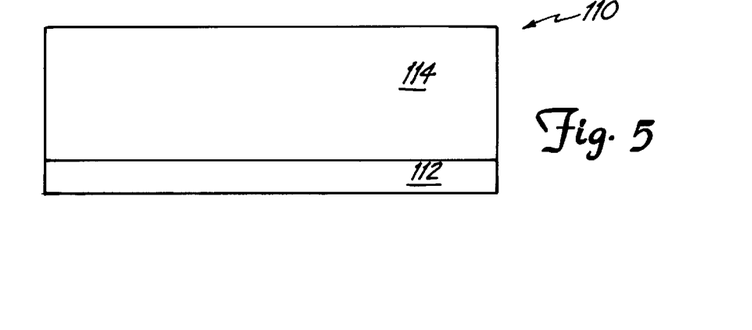
FIG. 5 is a cross-sectional view of a shield in accord with the present invention.

FIG. 5 is a cross-sectional view of shield 110 designed in accord with the present invention. Shield 110 has significant anisotropy, unlike the shields of the prior art, while still incorporating all the advantages of a shield formed with sendust, that is, mechanical hardness, substantially no magnetostriction, high permeability and high magnetic flux density. Shield 110 is formed by depositing layer 114 on seedlayer 112. Layer 114 is formed from an iron—silicon—aluminum alloy having the same three component elements as sendust, near-zero magnetostriction, and a finite value of magnetocrystalline anisotropy. Seedlayer 112 is formed of an amorphous alloy having very high anisotropy.

Seedlayer 112 is preferably formed of an alloy from the cobalt-amorphous family (such as cobalt—hafnium—niobium or cobalt—zirconium—tantalum) or of nickel, and most preferably, of the cobalt—zirconium—tantalum alloy. The percentage weight of cobalt is preferably in the range, of about 70 percent to about 90 percent, and the remainder is preferably equal percentage weights of zirconium and tantalum. A preferred embodiment has a percentage weight of cobalt equal to about 90 percent and percentage weights of both zirconium and tantalum each equal to about 5 percent. Seedlayer 112 preferably has a thickness in the range of about 100 angstroms to about 1000 angstroms.

Figure 6:
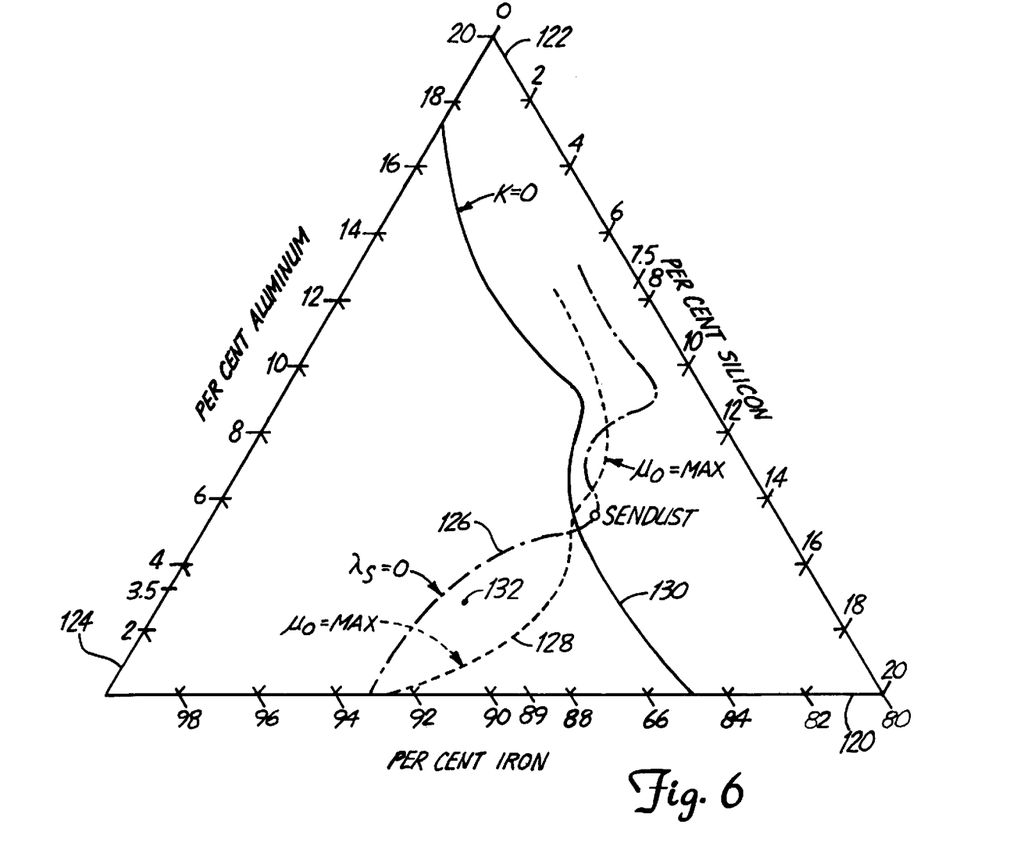
FIG. 6 is an iron—silicon—aluminum alloy composition diagram containing parameter plots and derived from FIG. 4.32 of Richard M. Bozorth, *Ferromagnetism* 100(1978).

FIG. 6 is an iron—silicon—aluminum alloy composition diagram containing plots for the following parameters: initial permeability $\mu_0$=MAX, magnetostriction $\lambda_s$=0, and crystal anisotropy constant K=0. FIG. 6 is derived from FIG. 4.32 of Richard M. Bozorth, *Ferromagnetism* 100(1978). Displayed on axis 120 is the percentage of iron, on axis 122 is the percentage of silicon, and on axis 124 is the percentage of aluminum in a particular composition of the iron—silicon—aluminum alloy. The composition selected for the present invention should be located near both parameter plot 126 for magnetostriction $\lambda_s$ equal to zero and parameter plot 128 for maximized initial permeability $\mu_0$ and far from parameter plot 130 for crystal anisotropy constant equal to 0.18. Preferably, the percentage weight of iron is in the range of from about 81 percent to about 93 percent, the percentage weight of silicon is in the range of from bout 6 percent to about 10 percent, and the percentage weight of aluminum is in the range of from about 0 percent to about 13 percent. In a preferred embodiment, layer 114 is preferably formed of composition 132, which has a percentage weight of iron equal to about 89 percent, a percentage weight of silicon equal to about 7.5 percent, and a percentage weight of aluminum equal to about 3.5 percent. Iron—silicon—aluminum alloy layer 114 preferably has a thickness in the range of about 1 micrometers to about 3 micrometers.

To set the anisotropy field, shield 110 should be thermally treated for up to 3 hours at 450 degrees Celsius in the presence of a magnetic field oriented in a desired direction for the anisotropy field.

Figure 7:
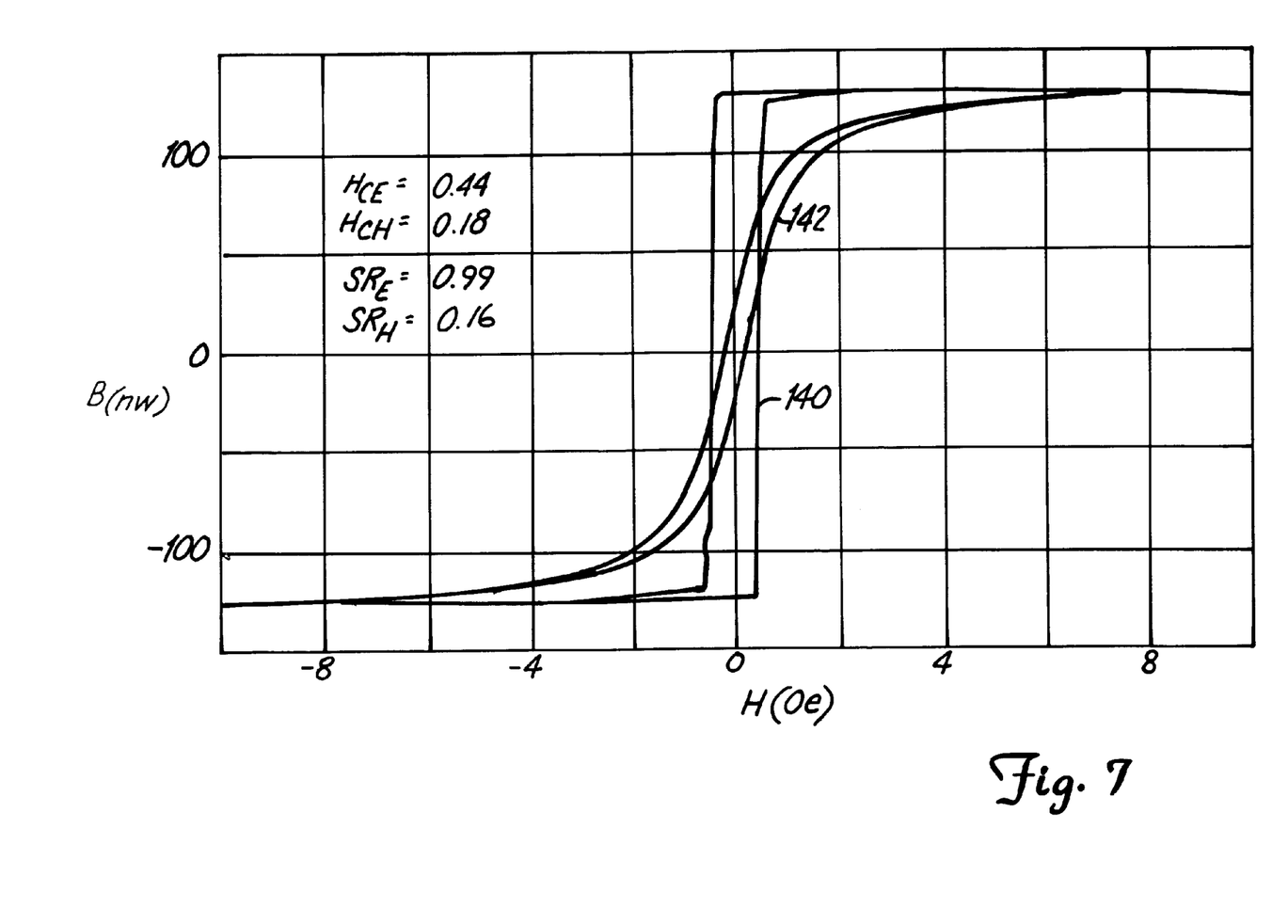
FIG. 7 is a plot of hysteresis loops for both easy and hard magnetic axes in a shield of the present invention.

FIG. 7 is a plot of easy-axis hysteresis loop 140 and hard-axis hysteresis loop 142 along both easy and hard magnetic axes, respectively, in a shield of the present invention. The applied field H is shown along the abscissa and the magnetic flux B of the shield is shown along the ordinate. The anisotropy constant of the shield of the present invention can be determined by extrapolating the slope of hard-axis hysteresis loop 142 where flux B equals zero, and extending that slope until it hits the saturation flux of hard-axis hysteresis loop 142; the value of field H at that point is the anisotropy constant. As evidence in FIG. 7, the anisotropy constant of the shield of the present invention is non-zero.

The squareness ratio $SR_E$ (which compares the value of flux B when field H equals zero to the value of flux B when field H is at its maximum value) of hysteresis loop 140 along the easy magnetic axis approximately equals 0.99 and the squareness ratio $SR_H$ of hysteresis loop 142 along the hard magnetic axis approximately equals 0.16. Coercive force $H_{CE}$ along the easy axis approximately equals 0.44, while coercive force $H_{CH}$ along the hard axis approximately equals 0.18. It is generally preferred that the squareness ratio of the easy axis approximately equal one, and that the squareness ratio of the hard axis approximately equal zero. It is also generally preferred that the coercivity on the hard axis be less than the coercivity on the easy axis.

Figure 8:
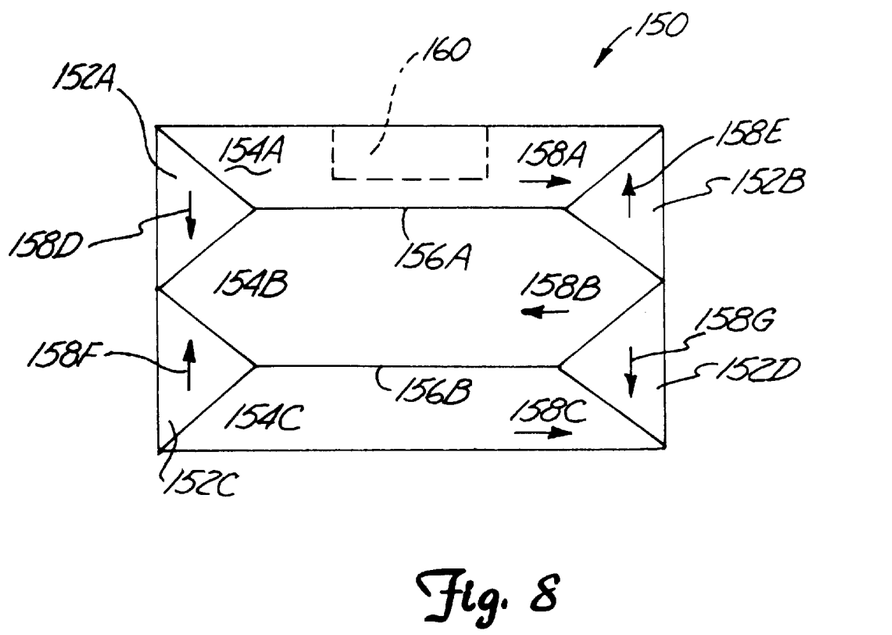
FIG. 8 is a cross-sectional view of a bottom shield of the present invention operating under no external magnetic field.

FIG. 8 is a cross-sectional view of shield 150 of the present invention operating under no external magnetic fields. Shield 150 includes closure magnetic domains 152A, 152B, 152C, and 152D, magnetic domains 154A, 154B, 154C, and magnetic domain walls 156A and 156B. Magnetizations 158A–158G represent the magnetization on each magnetic domain. Because of the magnetocrystalline anisotropy of shield 150, domain walls 156A and 156B orient themselves in the direction of the easy axis of shield 150. A property of magnetic domain walls 156A and 156B is that each is constantly attempting to settle at the lowest possible energy state. The lowest possible energy state in this case corresponds with the easy axis of shield 150.

Figure 9:
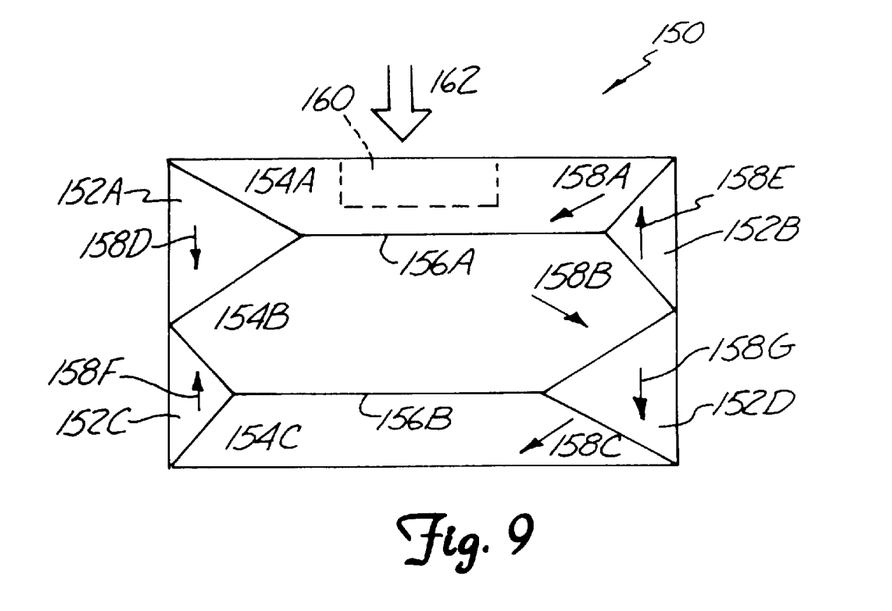
FIG. 9 is a cross-sectional view of the bottom shield of the present invention operating under an external magnetic field from a magnetic media.

FIG. 9 is cross-sectional view of shield 150 of the present invention operating under an external magnetic field from a magnetic media. The magnetic field is represented by arrow 162. External field 162 causes magnetizations 158A–158C to rotate in a direction toward the direction of external field 162. As shown in FIG. 9, external field 162 is operating in an downward direction. Thus, magnetization 158A–158C are rotating in an downward direction. However, it can be seen in FIG. 9 that magnetization 158D–158G, which correspond to closure magnetic domains 152A–152D, respectively, are not rotating in the presence of external field 162. Magnetizations 158D–158G do not rotate since these magnetizations are initially positioned either parallel or antiparallel to external field 162. With this parallel scheme, magnetizations 158D–158G do not rotate; however, the size and shape of closure magnetic domains 152A–152D do change. Closure magnetic domains 152A and 152D, whose respective magnetizations 158D and 158G are initially positioned parallel to external field 162, grow in size; whereas closure magnetic domains 152B and 152C, whose respective magnetizations 158E and 158F are initially positioned antiparallel to external field 162, shrink in size. The change in size of closure magnetic domains 152A–152D will cause a change in shape of magnetic domains 154A–154C; however, it will not cause the position of magnetic domain walls 156A and 156B to move in a direction toward read element 160. In prior art sendust-formed shields, there was no control over the initial location of magnetic domains, or consequently, the position of magnetic domain walls;. Shield 150, however, has anisotropy that allows for the initial location of magnetic domains to be controlled. Consequently, the position of magnetic domain walls 156A and 156B are controlled to not move in a direction towards read element 160. Magnetic domain wall 156A will remain pinned between closure magnetic domains 152A and 152B, and magnetic domain wall 156B will remain pinned between closure magnetic domains 152C and 152D, since a property of each magnetic domain wall 156A and 156B is that domain wall 156A or 156B is constantly attempting to settle at the lowest possible energy state. The lowest possible energy state in this case corresponds with the shortest possible length of magnetic domain wall 156A or 156B. Therefore, magnetic domain walls 156A and 156B will stay at a low and constant energy state positioned between intersecting points, of triangular shaped closure magnetic domains 152A–152D.

An additional advantage of the present invention is that a shield designed in accord with the present invention has been found to display high levels of magnetic permeance when subjected to ac magnetic fields in excess of 100 megahertz along the hard axis.

The present invention achieves a single magnetic domain state adjacent to a magnetoresistive read element of a magnetic recording head, and thereby achieves repeatable stable read back of information from a magnetic media. The present invention restricts the area of motion of shield domain walls to prevent their interaction with the read element. This is achieved by means of a shield having anisotropy that results in controlled location of magnetic domains. The present invention discloses two easy axis domain walls 156A and 156B; however, depending on the dimensions of a bottom shield, additional easy axis domain walls may be present.

Although the present invention has been described with reference to preferred embodiments, workers skilled in the art will recognize that changes may be made in form and detail without departing from the spirit and scope of the invention.

What is claimed is:

1. A magnetic data storage and retrieval system comprising:
   a magnetic reader apparatus comprising a read element and a shield positioned adjacent the read element for shielding the read element; and
   means for introducing magnetocrystalline anisotropy into the shield such that the shield exhibits limited domain wall movement.

2. A shield for a read element of a recording head, the shield comprising:
   a seedlayer formed of an amorphous alloy selected from the group consisting of cobalt-amorphous family alloy or nickel; and
   a second layer of an iron—silicon—aluminum alloy having both near-zero magnetostriction and non-zero magnetocrystalline anisotropy positioned upon the seedlayer.

3. The shield of claim 2 wherein the seedlayer is formed of a cobalt—zirconium—tantalum alloy.

4. The shield of claim 3 wherein a percentage weight of cobalt in the seedlayer is in the range of from about 70 percent to about 90 percent.

5. The shield of claim 4 wherein a percentage weight of zirconium in the seedlayer substantially equals a percentage weight of the tantalum in the seedlayer.

6. The shield of claim 3 wherein a percentage weight of cobalt in the seedlayer is about 90 percent, a percentage weight of zirconium in the seedlayer is about 5 percent, and a percentage weight of tantalum in the seedlayer is about 5 percent.

7. The shield of claim 2 wherein a percentage weight of iron in the second layer is in the range of from about 81 percent to about 93 percent, a percentage weight of silicon in the second layer is in the range of from about 6 percent to about 10 percent, and a percentage weight of aluminum in the second layer is in the range of from about 0 percent to about 13 percent.

8. The shield of claim 2 wherein a percentage weight of iron in the second layer is about 89 percent, a percentage weight of silicon in the second layer is about 7.5 percent, and a percentage weight of aluminum in the second layer is about 3.5 percent.

9. The shield of claim 2 wherein the seedlayer has a thickness within the range of from about 100 angstroms to about 1000 angstroms.

10. The shield of claim 2 wherein the second layer has a thickness within the range of from about 1 micrometer to about 3 micrometers.

11. A method for forming a shield for a read element of a recording head, the method comprising:
depositing a seedlayer of an amorphous alloy selected from the group consisting of cobalt-amorphous family alloy or nickel;
depositing a second layer of an iron—silicon—aluminum alloy having near-zero magnetostriction and non-zero magnetocrystalline anisotropy over the seedlayer; and
thermally treating the shield while the shield is in the presence of a magnetic field oriented in a desired direction of an anisotropy field of the shield.

12. The method of claim 11 wherein the seedlayer is formed of a cobalt—zirconium—tantalum alloy.

13. The method of claim 12 wherein a percentage weight of cobalt in the seedlayer is in the range of from about 70 percent to about 90 percent.

14. The method of claim 13 wherein a percentage weight of zirconium in the seedlayer substantially equals a percentage weight of the tantalum in the seedlayer.

15. The method of claim 12 wherein a percentage weight of cobalt in the seedlayer is about 90 percent, a percentage weight of zirconium in the seedlayer is about 5 percent, and a percentage weight of tantalum in the seedlayer is about 5 percent.

16. The method of claim 11 wherein a percentage weight of iron in the second layer is in the range of from about 81 percent to about 93 percent, a percentage weight of silicon in the second layer is in the range of from about 6 percent to about 10 percent, and a percentage weight of aluminum in the second layer is in the range of from about 0 percent to about 13 percent.

17. The method of claim 11 wherein a percentage weight of iron in the second layer is about 89 percent, a percentage weight of silicon in the second layer is about 7.5 percent, and a percentage weight of aluminum in the second layer is about 3.5 percent.

18. The method of claim 11 wherein the seedlayer a thickness within the range of from about 100 angstroms to about 1000 angstroms and the second layer has a thickness within the range of from about 1 micrometer to about 3 micrometers.

* * * * *